(12) United States Patent
Bang et al.

(10) Patent No.: US 12,021,277 B2
(45) Date of Patent: Jun. 25, 2024

(54) FUEL CELL SYSTEM, AND METHOD OF ITS OPERATION

(71) Applicant: BLUE WORLD TECHNOLOGIES HOLDING APS, Aalborg Ost (DK)

(72) Inventors: Mads Bang, Skorping (DK); Anders Risum Korsgaard, Aalborg (DK)

(73) Assignee: BLUE WORLD TECHNOLOGIES HOLDING APS, Aalborg Ost (DK)

( * ) Notice: Subject to any disclaimer, the term of this patent is extended or adjusted under 35 U.S.C. 154(b) by 553 days.

(21) Appl. No.: 17/295,580

(22) PCT Filed: Nov. 20, 2019

(86) PCT No.: PCT/DK2019/050362
§ 371 (c)(1),
(2) Date: May 20, 2021

(87) PCT Pub. No.: WO2020/103995
PCT Pub. Date: May 28, 2020

(65) Prior Publication Data
US 2022/0021010 A1  Jan. 20, 2022

(30) Foreign Application Priority Data

Nov. 20, 2018 (DK) .......................... PA 2018 70763
Jun. 21, 2019 (DK) .......................... PA 2019 70389

(51) Int. Cl.
*H01M 8/04302* (2016.01)
*H01M 8/04014* (2016.01)
*H01M 8/04223* (2016.01)
*H01M 8/04701* (2016.01)
*H01M 8/0612* (2016.01)

(52) U.S. Cl.
CPC ... *H01M 8/04022* (2013.01); *H01M 8/04268* (2013.01); *H01M 8/04738* (2013.01); *H01M 8/0618* (2013.01); *H01M 2250/20* (2013.01)

(58) Field of Classification Search
None
See application file for complete search history.

(56) References Cited

U.S. PATENT DOCUMENTS

| | | |
|---|---|---|
| 4,716,023 A | 12/1987 | Christner |
| 5,019,463 A | 5/1991 | Matsubara et al. |
| 5,998,053 A | 12/1999 | Diethelm |
| 6,939,567 B1 | 9/2005 | Prakash |
| 7,276,168 B2 | 10/2007 | Haibara et al. |
| 8,617,269 B2 | 12/2013 | Son et al. |

(Continued)

FOREIGN PATENT DOCUMENTS

| | | |
|---|---|---|
| EP | 1538129 A1 | 6/2005 |
| EP | 2492998 A1 | 8/2012 |

(Continued)

OTHER PUBLICATIONS

International Search Report for PCT/DK2019/050362 prepared by the Nordic Patent Institute, dated Jan. 28, 2020.

*Primary Examiner* — Lucas J. O'Donnell
(74) *Attorney, Agent, or Firm* — Brooks Kushman P. C.; John E. Nemazi

(57) ABSTRACT

In a fuel cell system, for example HTPEM fuel cells. a valve system is employed by selectively guiding exhaust gas from the burner either to the reformer for heating the reformer, especially during normal operation, or to by-pass the reformer in startup situations in order to heat the fuel cell stack before starting heating the reformer. Optionally, a compact burner/reformer unit is provided.

20 Claims, 6 Drawing Sheets

(56) References Cited

U.S. PATENT DOCUMENTS

| | | |
|---|---|---|
| 8,747,498 B2 | 6/2014 | Taguchi et al. |
| 9,238,781 B2 | 1/2016 | Du et al. |
| 2006/0107594 A1 | 5/2006 | Kuwaba |
| 2006/0199051 A1 | 9/2006 | Bai et al. |
| 2007/0202366 A1 | 8/2007 | Kim et al. |
| 2009/0092883 A1 | 4/2009 | Ozeki et al. |
| 2010/0062291 A1 | 3/2010 | Heo et al. |
| 2011/0039173 A1 | 2/2011 | Kanazu |
| 2011/0158860 A1 | 6/2011 | Son |
| 2011/0212375 A1 | 9/2011 | Taguchi et al. |
| 2012/0231359 A1 | 9/2012 | Fuju et al. |
| 2013/0195736 A1 | 8/2013 | Fischer |
| 2015/0118123 A1 | 4/2015 | Verykios |
| 2020/0161675 A1 | 5/2020 | Lawlor et al. |

FOREIGN PATENT DOCUMENTS

| | | | |
|---|---|---|---|
| EP | 2623194 | A1 | 8/2013 |
| EP | 2767506 | A1 | 8/2014 |
| EP | 3309887 | A1 | 4/2018 |
| EP | 3311911 | A1 | 4/2018 |
| GB | 2478188 | A | 8/2011 |
| JP | H05303972 | A | 11/1993 |
| JP | H6314569 | | 11/1994 |
| JP | H07223801 | A | 8/1995 |
| JP | H10297903 | A | 11/1998 |
| JP | 2005108649 | A | 4/2005 |
| JP | 2008303128 | A | 12/2008 |
| KR | 20060065779 | A | 6/2006 |
| KR | 100707834 | B1 | 4/2007 |
| KR | 100988470 | B1 | 10/2010 |
| KR | 101135494 | B1 | 4/2012 |
| KR | 20180074143 | A | 7/2018 |
| WO | 2008029682 | A1 | 3/2008 |
| WO | 2009115890 | A2 | 9/2009 |
| WO | 2010005165 | A2 | 1/2010 |
| WO | 2016/008486 | A1 | 1/2016 |
| WO | 2016008486 | A1 | 1/2016 |
| WO | 2017148487 | A1 | 9/2017 |
| WO | 2018/189375 | A1 | 10/2018 |

FUEL CELL SYSTEM, AND METHOD OF ITS OPERATION

CROSS-REFERENCE TO RELATED APPLICATION

This application is the U.S. national phase of PCT Application No. PCT/DK2019/050362 filed on Nov. 20, 2019, which claims priority to DK Patent Application No. PA 2018 70763 filed on Nov. 20, 2018, and DK Patent Application No. PA 2019 70389 filed on Jun. 21, 2019 the disclosures of which are incorporated in their entirety by reference herein.

FIELD OF THE INVENTION

The present invention relates to fuel cell systems, especially HTPEM fuel cells, with a burner and a reformer and its use for a vehicle as well as methods of operating such fuel cell system.

BACKGROUND OF THE INVENTION

When generating electricity with fuel cell systems, also heat is generated as a byproduct, which is removed by cooling-liquid that is circulating through channels in the fuel cell. The temperature is adjusted by flow of cooling-liquid, for example based on glycol, through heat exchangers and radiators for optimized function of the fuel cell.

On the other hand, the coolant can be used for heating the fuel cells during startup conditions.

As example thereof is disclosed in WO2016/008486, in which a compact fuel cell system comprises a burner, the exhaust gas of which is passed along the outer wall of a reformer for heating it to a temperature necessary for its production of syngas on the basis of evaporated fuel. Once, the exhaust gas, also called flue gas, from the burner has passed the reformer for transfer of heat to the reformer, the gas transfers heat to a heat exchanger downstream of the reformer. The heat exchanger transfers thermal energy to the cooling-liquid in the cooling system for heating it in startup situations where the fuel cell stack shall be activated quickly.

During start-up of the fuel cell system, a quick rise in temperature is desired in order to get the fuel cell system into operation quickly. However, a quick startup requires aggressive use of the burner and high temperature of the exhaust gas. To a certain extent this is advantageous in that efficient use of the burner at high temperature implies so-called clean burning.

However, the inventors of the present invention have realized that during optimum burning in start-up situations, the temperature of the exhaust gas may become so high that there is a risk for degradation of the reformer by the heat of the exhaust gas. Accordingly, it would be desirable, if there could be found a balance between quick startup and protection of the reformer against overheating. This problem appears not to have having been solved satisfactory in the prior art, especially not for compact burner/reformer combinations.

When generating electricity with fuel cell systems in vehicles, it is important that the fuel cell system is compact and efficient. On the other hand, it is also important that the system is robust and long living. One of the components that needs compactness is the burner/reformer combination where the burner is used to provide thermal energy to the reformer in order for the reforming process to proceed efficiently.

WO2018/189375 discloses a burner inside a tubular reformer. The thermal energy is provided by thermal conduction through the wall therein between as well as through the heating of the gas in heat exchanger. Although, the reformer/burner unit is compact, it lacks a thermal protection for the reformer. As it reads on page 11 lines 14-18 in WO2018/189375, there is a good transport of heat from the burner to the reformer due to the reformer is surrounded by the reformer-catalyser along all of its length. Under aggressive start-up, however, the reformer is correspondingly heated by the thermal conductivity through the wall, and the reformer is not properly protected against degradation by overheating.

Heat transfer through the wall between the burner and reformer are also disclosed in KR20060065779 and U.S. Pat. No. 8,617,269 by Son and assigned to Samsung, as well as in U.S. Pat. No. 9,238,781 by Du as well as KR, the latter disclosing a helical wall portion from the burner extending into the reformer. A similar wall portion extending into the reformer is disclosed in Korean KR100988470 assigned to Korea Mach and Materials Inst.

Protection against overheating is provided in the system of WO2016/008486, in which a compact fuel cell system comprises a burner, the exhaust gas of which is passed along the outer wall of a reformer for heating it to a temperature necessary for its production of syngas on the basis of evaporated fuel. Although, the configuration is compact, the energy transfer is not optimized. For example, there is no use of the radiation energy from the burner, which otherwise contains a substantial amount of energy.

U.S. Pat. No. 5,998,053 discloses both radiation energy and thermal energy transfer from the gas through the wall. Thermal energy is only supplied from the outer cylindrical wall of the reformer, which is surrounded by a burner.

U.S. Pat. No. 5,019,463 discloses a fuel cell system with a burner upstream of a reformer where the exhaust gas from the heater is guided around the reformer and discharged through an exhaust pipe and through atmospheric gas outlet. For startup, the gas is selectively guided by a valve to pipe to heat the air ports and cooling jacket of the fuel cell. Although, there is a selective diversion of gas, it does not protect the reformer under quick aggressive startup heating, as the diversion is downstream of the reformer.

Flow along one side of reformers is not optimum efficient. U.S. Pat. No. 6,939,567 by Ueda discloses a burner with a central tubular burner inside a central cavity of a reformer formed as a hollow cylindrical tube. The burner is provided distal to a first end of the reformer where the reformer receives the raw fuel for reforming, and the flue gas flows inside a burner chamber towards the first end and makes a 180 degrees turn and flows then along the reformer wall in the same direction as the reformer gas. The reformer gas as well as the flue gas make a 180 degrees turn and flow both towards the first end, where the reformed gas and the combustion exhaust gas are released. As the flue gas follows the flow direction of the reformed gas, it heats the reformer gas only on one side of the reformer gas flow through the reformer. It is therefore not optimized with respect to heat transfer. A similar configuration is found in US2013/0195736 by Fischer and in JPH07223801 assigned to Fuji electric Co.

U.S. Pat. No. 5,998,053 discloses a fuel cell system in which exhaust gas can be selectively guided by a valve to the fuel cell system, which also includes the reformer, or to a heating system for a room. Although, there is a selective diversion of gas upstream of the reformer, it does not protect the reformer under quick aggressive startup heating.

EP 3311911 A1 by LG Electronics Inc. also discloses a fuel system in which a burner is installed.

It would be desirable to provide a better way of protecting the reformer against overheating in startup situation.

Also, for fuel cell systems, especially in the automobile industry, there is a steady demand for optimization.

DESCRIPTION/SUMMARY OF THE INVENTION

It is an objective of the invention to provide an improvement in the art. In particular, it is an objective to provide a fuel cell system with a burner/reformer unit, where exhaust gas of the burner is used efficiently for heating the reformer, however, including heat protection of the reformer during startup of the fuel cell system. This objective and further objectives are achieved with a fuel cell system, burner/reformer unit, and method as described in the following and in the claims.

As set forth in the following, different principles are presented for achieving thermal protection of the reformer, despite compactness, while optimizing the thermal efficiency.

For use in a fuel cell system, a burner/reformer unit is provided which comprises a reformer with a catalyzer for catalytic conversion of fuel vapor to syngas for a fuel cell. In operation, it is conduit-connected to the anode side of the fuel cell for provision of syngas to the fuel cell. Furthermore, a burner provides thermal energy to the reformer for heating the catalyzer. The burner is configured for providing flue gas by burning anode waste gas or fuel or both. In some practical embodiments, the burner/reformer unit also comprises a housing around the reformer. Optionally, the burner/reformer unit is provided compact by arranging the burner inside the reformer.

A first technical solution for thermal protection differs from the above prior art disclosures in that a valve system is employed for selectively guiding exhaust gas from the burner either to the reformer for heating the reformer, especially during normal operation, or to a heat exchanger while by-passing the reformer in startup situations in order to heat the fuel cell stack before starting heating the reformer. The system and method are particular useful in a compact burner/reformer unit where the heat from the burner is reaching the reformer by conduction of heat through the intermediate walls.

For example, the valve is an on/off valve for toggling between flow along the reformer wall and flow out of the burner chamber. Optionally, the valve system is be configured for regulating the exhaust gas from the burner to only partially pass the reformer so that the temperature of the reformer can be regulated, for example continuously regulated by adjusting the opening of the valve for the partial flow to the reformer. The remaining part of the how flue gas flow is advantageously guided to the downstream heat exchanger which transfers heat to the cooling circuit. A gradual regulation of the partial by-pass is useful in start-up situation, as the reformer can be heated gently and controlled.

In order to prevent the reformer from overheating during the aggressive startup, it has been found advantageous that the reformer is at least partially thermally insulated from the burner. For example, the reformer walls are provided at a distance from the burner wall.

For this reason, a second technical solution is provided, advantageously but not necessarily combined with the first technical solution, comprises a space between the burner and the reformer through which flue gas flows for controlled heating of the reformer. Thus, the burner walls are not conducting heat directly into the reformer.

In order to regulate such thermal insulation additionally, some embodiments comprise an air flow regulation in which ambient air is guided along a space between the burner and the reformer so that increased air flow along the reformer thermally insulates the reformer catalyzer from the hot walls of the central burner.

Various aspects also of the first and second technical solution, optionally in combination, are explained in more detail in the following.

Options for the Fuel Cell

The fuel cell system comprises a fuel cell, typically a fuel cell stack. Herein, the term fuel cell is used for a single fuel cell as well as for multiple fuel cells, for example a fuel cell stack.

For example, the fuel cells are high temperature proton exchange membrane fuel cells, also called high temperature proton electrolyte membrane (HTPEM) fuel cells, which operate above 120 degrees Celsius, differentiating HTPEM fuel cell from low temperature PEM fuel cells, the latter operating at temperatures below 100 degrees Celsius, for example at 70 degrees Celsius. The operating temperature of HTPEM fuel cells is the range of 120 to 200 degrees Celsius, for example in the range of 160 to 170 degrees Celsius. The electrolyte membrane in the HTPEM fuel cell is mineral acid based, typically a polymer film, for example polybenzimidazole doped with phosphoric acid. HTPEM fuel cells are advantageous in being tolerant to relatively high CO concentration and are therefore not requiring PrOx reactors between the reformer and the fuel cell stack, why simple, lightweight and inexpensive reformers can be used, which minimizes the overall size and weight of the system in line with the purpose of providing compact fuel cell systems, for example for automobile industry.

The fuel cell is used to create electricity, for example for driving a vehicle, such as an automobile. In order to provide a buffer for the produced electricity, typically a battery system is provided in electrical connection with the fuel cell.

A cooling circuit is provided for recirculating coolant through the fuel cell for adjusting the temperature of the fuel cell with the coolant. During normal operation, the cooling circuit is taking up heat from the fuel cell in order to keep the temperature stable and in an optimized range. For example, the temperature of the fuel cell is 170 degrees Celsius, and the coolant has a temperature of 160 degrees Celsius at the entrance of the fuel cell.

A reformer with a catalyser is used for catalytic conversion of fuel into syngas used in the fuel cell for production of electricity. Accordingly, the reformer is conduit-connected to the anode side of the fuel cell. The reformer comprises a catalyser inside a reformer housing, which has reformer walls.

For the catalytic reaction in the reformer, the provided liquid fuel is evaporated in an evaporator that is conduit-connected on its downstream side by a fuel vapor conduit to the reformer. The upstream side of the evaporator is conduit-connected to a liquid fuel supply, for example for receiving a mix of liquid methanol and water.

For heating the reformer to the proper catalytic conversion temperature, for example in the range of 250-300 degrees Celsius, flue gas, for example at a temperature in the range of 350-400 degrees Celsius, is provided from a burner.

In normal operation, the flue gas from the burner is passing along the reformer walls and heat them. After the transfer of the thermal energy from the flue gas to the reformer walls, remaining thermal energy can be used for heating other components, for example batteries that are used to store the electrical energy of the fuel cell, or for heating a vehicle cabin.

During startup of the fuel cell system, the fuel cell has to be heated up for reaching a steady state electricity-producing state. Especially for use in vehicles, the start-up procedure should be fast. For this reason, the burner is used strongly in the start-up phase, transferring its heat to the fuel cell.

Typically, this is done in practice by transferring the heat from the flue gas to the coolant in the cooling cycle which during start-up is used as heating fluid, instead, to heat up the fuel cell to a temperature suitable for normal operation.

In practical embodiments, the downstream side of the flue gas outlet conduit is in flow-communication with a heat exchanger for transfer of thermal energy from the flue gas to the coolant in the cooling circuit for transfer of thermal energy to the coolant.

In some practical embodiments, the liquid fuel supply comprises a methanol reservoir for supplying methanol as well as a water supply for supplying water and for mixing the water with the methanol at a mixing point upstream of the evaporator, and the water supply is configured for supply of water that is recycled from the flue gas of the burner.

In concrete embodiments, water and methanol are supplied to the mixing point, the mix of water and methanol are evaporated in an evaporator, the evaporated mix is fed as fuel into the reformer and catalytically reacted to syngas, which is then fed into the anode side of the fuel cell for producing off-gas. The off-gas from the anode is fed into the burner and burned, typically catalytically burned, to flue-gas, which is fed into a condenser for condensing water out of the flue gas.

Operation of the Fuel Cell

As discussed above, a quick startup requires aggressive use of the burner and high temperature of the exhaust gas, which is advantageous in that efficient use of the burner at high temperature implies so-called clean burning, but which implies the risk for degradation of the reformer by overheating. In the following, different technical solutions are given to this problem.

A first method of preventing overheating of the reformer is achieved by providing a by-pass valve in communication with the burner-chamber. The by-pass valve is configured for regulating flow of the flue gas between flow along the reformer walls and flow out of the burner-chamber through a flue gas outlet conduit, by-passing the reformer walls for preventing it from flowing along the reformer walls. By operating the by-pass valve, the flow of the flue gas between flow along the reformer walls and flow that is by-passing the reformer walls is regulated.

For example, by the by-pass valve, an exhaust path is selectively established in which a by-pass-quantity of the flue gas is guided out of the burner-chamber through a flue gas outlet conduit, by-passing the reformer walls. The by-pass quantity, which is a portion or all of the flue gas, is thus prevented from flowing along the reformer walls.

For example for start-up, the by-pass valve is set into a start-up configuration where all or most of the flue gas in the start-up phase is by-passing the reformer and the thermal energy from the flue gas is used instead to heat the fuel cell. This leads to a quick start-up procedure. After the start-up, the by-pass valve is switched such that the flue gas is flowing along the reformer walls.

In practical embodiments, the downstream side of the flue gas outlet conduit is in flow-communication with a heat exchanger for transfer of thermal energy from the flue gas to the coolant in the cooling circuit for transfer of thermal energy to the coolant. A by-pass-quantity of more than half of the flue gas from the burner, for example all or substantially all of the flue gas is by-passing the reformer in start-up situation and reaches the heat exchanger for transfer of a majority of the thermal energy of the flue gas to the coolant and not to the reformer in order to heat the fuel cell to a normal operation temperature.

Then, after the start-up, the by-pass valve is set into a normal operation configuration, closing for by-passing the reformer and causing all of the flue gas to flow along the reformer walls for heating of the reformer catalyser during normal operation.

In some embodiments, the by-pass quantity can be changed during start-up of the fuel cell system for regulating the amount of thermal energy transferred from the burner to the reformer. For example, instead of first causing all flue gas to by-pass the reformer and reach the heat exchanger until normal operation temperature of the fuel cell is reached, a minor portion is used for moderately heating the reformer during start-up, especially in the late phase of the start-up procedure. In case that the by-pass valve is variable adjustable with respect to the amount of flue gas that by-passes the reformer, the temperature profile for heating the reformer during start-up can be regulated precisely.

In principle, it is even possible to provide and regulate a by-pass quantity during normal operation.

Optionally, in order to provide one way of a compact burner/reformer unit, the reformer walls are tubular and surround the burner walls. However, this is not strictly necessary, and a side-by-side configuration of the burner/reformer or a configuration of a burner sandwiched between two sections of the reformer is also possible.

Aspects with a Space Between the Burner and the Reformer

Related to such compact configurations, a second method of preventing overheating of the reformer is explained in the following and suitable for combination with the first method of preventing overheating by using a valve, which was explained above.

In this second method, an insulating space, for example filled with insulation material, is provided between the reformer walls and the burner walls for thermal insulation from the conductive heat from the burner walls, however, used for guiding the flue gas along the reformer.

Optionally, an air supply is provided for supplying air, optionally ambient air, into the insulating space for flow of the air through the insulating space. For example, the airflow is along the walls of the reformer and not only insulate the reformer walls from the burner walls but also remove heat from the insulation space. It can even cool the reformer when heated by radiation from the burner wall.

Advantageously, the reformer comprises reformer walls and a catalyzer enclosed by the reformer walls. The reformer walls are tubular and comprise an inner cylindrical wall and an outer cylindrical wall that form a hollow cylinder with a central axis and a reformer length L when measured in one direction along the central axis. The hollow cylinder comprises a first end and a second end, the first end being spaced by the reformer length L from the second end. In some embodiments, the burner is provided in a central cavity of the reformer, which is formed as a hollow cylinder.

In some aspects, the burner comprises a tubular burner wall. Advantageously, the inner wall of the reformer surrounds the burner wall and is spaced from the burner wall thereby providing a space between the inner wall and the burner wall, wherein the burner-chamber is in fluid-flow communication with the space by a flue gas conduit.

A housing encloses the reformer, wherein a further space is provided between the outer wall of the reformer and the housing. The space and the further space are interconnected at the first end through a connecting front-end chamber and form a heat exchange chamber. The heating from opposite sides of a cylindrical reformer increases the heating efficiency while at the same time preventing thermal overload.

In some aspects, the reformer comprises an inlet for fuel vapor at the first end and an outlet for syngas at the second end and a reformer flow direction from the inlet to the outlet, which is in average unidirectional from the first end to the second end. In such case, the direction of flow of the flue gas in the space is opposite to the reformer flow direction.

For operation, flue gas flows from the burner chamber through the flue gas conduit into the space, which is part of the heat exchange chamber around the reformer, then along the inner cylindrical wall of the reformer to the first end of the reformer (advantageously without re-entering the burner chamber), causing transfer of heat from the flue gas to the inner wall inner for heating the catalyzer by heat conduction through the inner wall, then through the front-end chamber into the further space, and then along the along the outer wall to the second end of the reformer, and out of the burner/reformer unit through a flue gas outlet conduit, Especially, in the event that the burner is used for start-up and correspondingly aggressive burning, the space between the burner wall and the inner cylindrical wall prevents overheating of the reformer.

Although, the space insulates for direct contact between the burner wall and the reformer wall, it allows heat radiation from the burner wall to reach the reformer wall. This heat radiation adds to thermal energy transfer without the risk of overheating the reformer.

For example, the burner comprises an injection manifold for injecting off gas or fuel into the burner, wherein the injection manifold is provided closer to the first end of the reformer than to the second end for providing radiation energy primarily to the reformer at or near the first end. At the first end, most energy is required, however, without overheating the reformer, why the addition of radiation energy at this first end is advantageous.

However, the main heat transfer from the burner to the reformer is achieved by transport of thermal energy by the flue gas.

It is pointed out that the flow of the flue gas inside the space between the burner and the inner cylindrical wall of the reformer is in a direction opposite to the flow direction of the reformer gas through the reformer, whereas the flow in the further space, which is between the outer cylindrical wall of the reformer and the housing, is in the same direction as the flow of the reformer gas in the reformer. It is emphasized that the reformer gas in the reformer is subject to turbulences and possibly even a helical path, why the term "direction" in relation to the gases have to be understood as averaged direction. For example, even if the flow inside the reformer is along a helical path, it is in average along a line from the inlet to the outlet without changing an average direction towards the inlet.

In some embodiments, no by-pass valve, as explained above, is provided. In such embodiments, the whole flue gas from the burner is guided around the reformer such that the flue gas can only exit through the flue gas outlet conduit, downstream of the further space at the outer side of the outer cylindrical wall of the reformer. In particular, for this purpose, a separation wall is provided between the burner chamber and the flue gas outlet conduit and between the space and the flue gas outlet conduit for preventing the flue gas from by-passing the further space between the housing and the outer cylindrical wall while instead forcing the flue gas to always flow around the reformer. These embodiments are provided without a by-pass valve. However, other embodiments also include such by-pass valve, as described above.

The following optional advantageous embodiments are useful for optimizing the profile for the thermal transfer to the reformer. For example, the flue gas conduit is provided in the burner wall. Optionally, the flue gas conduit for flow of flue gas from the burner chamber to the heat exchange chamber is provided at a distance from the secand end, wherein the distance is in the range of 10%-50% of L, the distance being measured along a central axis of the reformer. As an option, the flue gas conduit for flow of flue gas from the burner chamber to the heat exchange chamber extends over a length being in the range of 5%-60% of L, the length being measured along a central axis of the reformer. Optionally, the sum of the distance and the length is in the range of 15%-80% of L.

In some embodiments, the reformer comprises a helical wall extending between the first and second ends and between the inner and outer cylindrical walls, the helical wall defining a helical flow path through the reformer. The helical wall extends the length of the flow path through the reformer to longer than a direct flow along the distance from the first end to the second end. Such helical path has the advantage over the prior art in that it makes the flow path in the reformer longer without the necessity of creating a counter-flow in two directions through the reformer. Furthermore, the helical path improves mixing of the gas in the reformer.

For example, the reformer catalyst is provided as granules between windings of the helical wall in order for efficient reforming.

Optionally, by adjusting the position of the release of hot flue gas from the burner to the walls of the reformer, a heating profile can be optimized. Optionally, more than one flu gas conduit is provided, the multiple flu gas conduits being provided at different locations along the length of the reformer in order to optimize the temperature profile in the reformer.

Aspects Concerning Recycling of Water

A further general improvement is mentioned in the following, which finds application not only with the above embodiments but which is useful as a general principle in fuel cells that use water for the fuel cell, such as a mix of methanol and water as explained above for the HTPEM fuel cell. In this improvement, the water from the fuel cell and/or from the burner is recycled.

In some practical embodiments, the liquid fuel supply comprises a methanol reservoir for supplying methanol as well as a water supply for supplying water and for mixing the water with the methanol at a mixing point upstream of the evaporator, and the water supply is configured for supply of water that is recycled from the flue gas of the burner.

For example, the water supply is part of a recycling circuit from the mixing point, through the evaporator, through the reformer, through the anode side of the fuel cell, through the burner, through a condenser, and back to the mixing point.

Optionally, the recycling circuit is configured for adding water from the outlet of the cathode side of the fuel cell.

In concrete embodiments, water and methanol are supplied to the mixing point, the mix of water and methanol are evaporated in an evaporator, the evaporated mix is fed as fuel into the reformer and catalytically reacted to syngas, which is then fed into the anode side of the fuel cell for producing off-gas. The off-gas from the anode is fed into the burner and burned, typically catalytically burned, to flue-gas, which is fed into a condenser for condensing water out of the flue gas. The water is fed back to the mixing point for repeating the cycle. Optionally, water from the outlet of the cathode side of the fuel cell is added to the recycling circuit.

Optionally, in order to use the waste heat, the fuel cell system comprises a further heat exchanger for transfer of thermal energy from the coolant to air upstream of the burner. This is used for increasing the temperature of the air prior to entering the burner-chamber, which increases the energy efficacy of the fuel cell system.

ASPECTS

In the following a number of aspects as explained which are interrelated and which can be combined with the other aspects mentioned herein.

Aspect 1. A burner/reformer unit for a fuel cell system; the burner/reformer unit comprising a reformer with a catalyzer for catalytic conversion of fuel vapor to syngas for a fuel cell, a housing around the reformer, and a burner for providing thermal energy to the reformer for heating the catalyzer;
  wherein the reformer comprises a cylindrical inner wall and a cylindrical outer wall between which the catalyzer is located; wherein the inner wall and outer wall form a hollow cylinder with a central axis and a reformer length L when measured in one direction along the central axis, wherein the hollow cylinder comprises a first end and a second end, the first end being spaced by the reformer length L from the second end;
  wherein the burner is configured for providing flue gas by burning anode waste gas or fuel or both and comprises a tubular burner wall, wherein the inner wall of the reformer surrounds the burner wall and is spaced from the burner wall thereby providing a space between the inner wall and the burner wall, wherein the burner-chamber is in fluid-flow communication with the space by a flue gas conduit;
  wherein the housing encloses the reformer, wherein a further space is provided between the outer wall of the reformer and the housing; wherein the space and the further space are interconnected at the first end through a connecting front-end chamber;
  wherein the burner/reformer unit is configured for flow of flue gas from the burner chamber through the flue gas conduit into the space, then along the inner cylindrical wall to the first end of the reformer without re-entering the burner chamber, for transfer of heat from the flue gas to inner for heating the catalyzer by heat conduction through the inner wall, then through the front-end chamber into the further space and then along the along the outer wall to the second end of the reformer and out of the burner/reformer unit through a flue gas outlet conduit,
  characterized in that the reformer comprises an inlet for fuel vapor at the first end and an outlet for syngas at the second end and a reformer flow direction from the inlet to the outlet which is in average unidirectional from the first end to the second end and that the direction of flow of the flue gas in the space is opposite to the reformer flow direction.

Aspect 2. A burner/reformer unit according to aspect 1, wherein the flue gas conduit for flow of flue gas from the burner chamber to the heat exchange chamber is spaced by a first conduit distance from the second end wherein the first conduit distance is in the range of 15%-50% of the reformer length L, the first conduit distance being measured along a central axis of the reformer.

Aspect 3. A burner/reformer unit according aspect 2, wherein the flue gas conduit for flow of flue gas from the burner chamber to the heat exchange chamber extends over a first conduit length being in the range of 10%-60% of the reformer length L, the first conduit length being measured along the central axis of the reformer.

Aspect 4. A burner/reformer unit according to aspect 3, wherein the sum of the first conduit distance and the first conduit length is in the range of 25%-80% of L.

Aspect 5. A burner/reformer unit according to any preceding aspect, wherein the flue gas conduit is provided as a first group of perforations in the burner chamber.

Aspect 6. A burner/reformer unit according to aspect 5, wherein a further flue gas conduit is provided as a second group of perforations in the burner chamber; the further flue gas conduit being located closer to the first end than the flue gas conduit; wherein adjacent perforations in the first group are interspaced with a first spacing; and wherein a group distance between the first and the second group is at least 10 times the first spacing; and wherein the further flue gas conduit has a different total flow area than the flue gas conduit.

Aspect 7. A burner/reformer unit according to any preceding aspect, wherein the burner comprises an injection manifold or injecting off gas or fuel into the burner, wherein the injection manifold is provided inside the burner chamber closer to the first end of the reformer than to the second end for providing radiation energy to the reformer primarily at the first end.

Aspect 8. A burner/reformer unit according to any preceding aspect, wherein a separation wall is provided between the burner chamber and the flue gas outlet conduit and between the space and the flue gas outlet conduit for preventing the flue gas from by-passing the reformer and instead force the flue gas to flow into the space and the further space.

Aspect 9. A burner/reformer unit according to any preceding aspect, wherein the reformer comprises a helical flow guide extending between the first and second ends and between the inner and outer cylindrical walls, the helical flow guide defining a helical flow path through the reformer for extending the length of the flow path through the reformer to longer than a distance from the first end to the second end when measured along a central axis of the reformer, wherein the catalyst is provided between windings of the helical flow guide.

Aspect 10. A method of operating a burner/reformer unit according to anyone of the aspects 1-7; wherein the method comprises causing flow of flue gas from the burner chamber through the flue gas conduit into the space, then along the inner cylindrical wall to the first end of the reformer without re-entering the burner chamber and then through the front-end chamber into the further space and then along the along the outer wall to the second end of the reformer and out of the burner/reformer unit through a flue gas outlet conduit, characterized in that the method comprises providing the reformer with an inlet for fuel vapor at the first end and an outlet for syngas at the second end and causing a flow direction from the inlet to the outlet which is in average unidirectional from the first end to the second end and a direction of flow of the flue gas in the space opposite to the reformer flow direction.

Aspect 11. Use of a burner/reformer unit according to any one of the aspects 1-9 for a fuel cell system in an automobile.

Aspect 12. Use according to aspect 11, wherein the fuel cell system comprises a HTPEM fuel cell configured for operating at a temperature in the range of 120-200 degrees Celsius with a liquid fuel that is a mix of methanol and water.

SHORT DESCRIPTION OF THE DRAWINGS

The invention will be explained in more detail with reference to the drawing, where FIG. 1 illustrates an example of a fuel cell system;

Figure 5A:
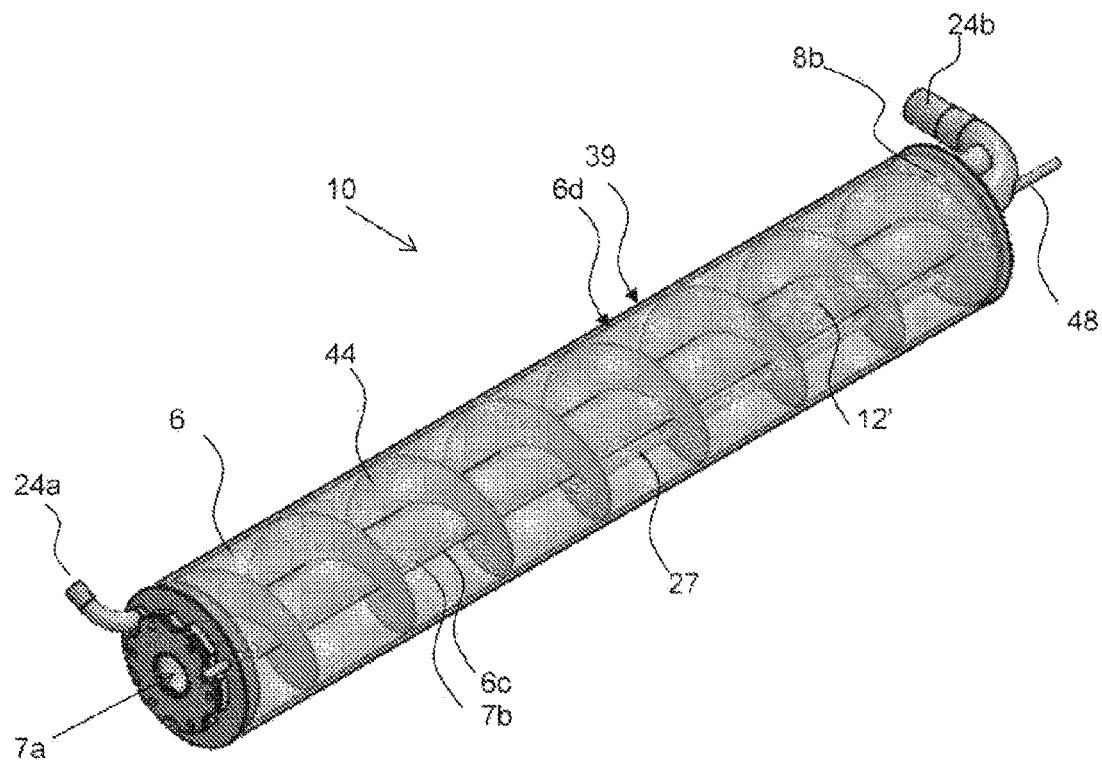
Figure 5B:
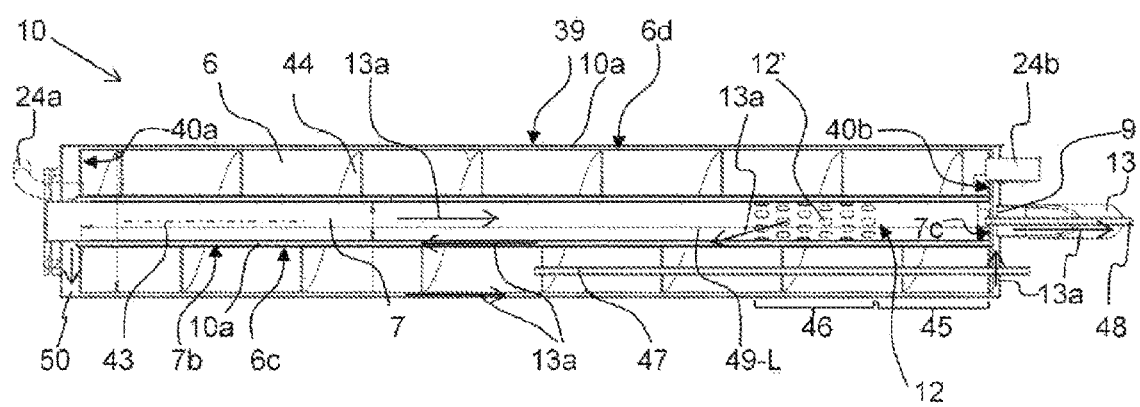

FIGS. 4a, 4b, 4c, and 4d illustrate alternative embodiments with offset flue gas conduits;

FIG. 5a exemplifies a compact burner/reformer unit with a reformer comprising a helical flow guide in perspective view;

FIG. 5b is a cross sectional line drawing of the reformer with the helical flow guide.

DETAILED DESCRIPTION/PREFERRED EMBODIMENT

Figure 1:
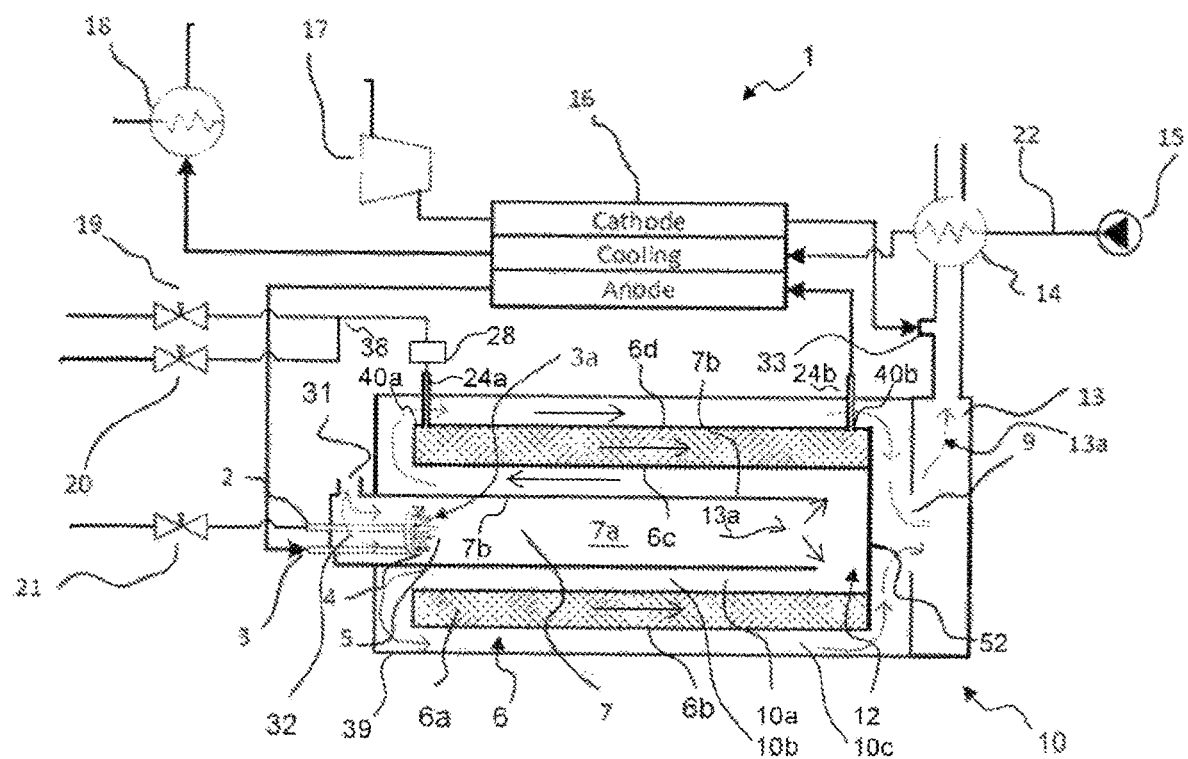

FIG. 1 illustrate a fuel cell system 1 with a fuel cell 16, typically fuel cell stack, and a burner/reformer unit 10 comprising a burner 7 and a reformer 6. The burner 7 comprises a burner-chamber 7a for producing flue gas with thermal energy for heating the reformer 6. Inside the burner-chamber 7a, typically, a burner-catalyser is provided, which however is not shown for simplicity in FIGS. 1 and 2.

For example, the burner 7 is sandwiched between two layers of a heat exchange chamber 10b, inside which the reformer 6 is located.

Alternatively, the burner 7 is of cylindrical shape and surrounded by a cylindrical tubular heat exchange chamber 10a, formed as a hollow tube with an inner cavity and a ring-shaped cross section. Especially, the cylindrical configuration is compact, which is advantageous when using it in an automobile, where space is scarce.

The cylindrical reformer 6 is provided inside reformer walls 6b comprising an inner cylindrical wall 6c and an outer cylindrical wall 6d that is coaxial with the inner cylindrical wall 6c.

An air inlet 31 provides an air flow 32 into the burner-chamber 7a. Through off-gas inlet 3 and injection-manifold 4, off-gas 3a from the anode of the fuel cell 16 enters the burner-chamber 7a and is used as fuel in the burner 7, as the off-gas contains fuel remains even after the reaction in the fuel cell 16. The flue gas 13a from the burning in the burner-chamber 7a is flowing into the heat exchange chamber 10a.

Containing substantial heat, the flue gas 13a heats the outer sides of the walls 6b of the reformer 6 by flowing along them. By conduction of thermal energy through the walls 6b, typical metal walls, the thermal energy from the flue gas 13a is transferred to the catalyser 6a inside the space enclosed by the reformer walls 6b.

The heated catalyser 6a in the reformer 6 receives a mix of water and methanol from a an evaporator 28, which is arranged downstream of mixing point 38 to which water has been supplied from a dosing supply 19 and methanol through a methanol dosing valve 20. The mix enters the reformer 6 through inlet 24a at a first end 40a of the cylindrical reformer 6. In the reformer 6, the mix is catalysed into syngas that leaves the reformer 6 thorough an outlet 24b at a second end 40b of the cylindrical reformer 6, from which is fed into the anode of the fuel cell 16. The cathode is fed with air from a compressor 17 for providing oxygen.

As illustrated in FIG. 1, the walls 7b of the burner chamber 7a are not abutting the reformer walls 6b, especially not the inner wall 6c of the reformer 6, but a space 10b is provided in between, which is insulating and preventing direct heat conduction from the burner chamber walls 7b to the reformer walls 6b. This advantageously prevents overheating of the reformer 6.

In contrast to some prior art, the reformer 6 does not have a second stage, redirecting the reformer gas into a counter flow towards the first end 40a of the cylindrical reformer 6. Instead, the averaged reformer flow is unidirectional from a first end 40a to a second end 40b of the reformer 6, as indicated by an arrow.

The flue gas 13a inside the burner 7 has a direction towards the second reformer end 40b, and then enters the heat exchange chamber 10a, through a flue gas conduit 12 at the separation wall 52.

The separation wall 52 is provided at the second end 40b of the reformer and is solid and extends across the hollow chamber that contains the burner chamber 7a and which is delimited by the inner wall 6c. The separation wall 52 separates the burner 7 and the upstream part of the heat exchange chamber 10a from the flue gas outlet conduit 9 and from the flue gas chamber 13 so that the only option for the flue gas to reach the flue gas chamber 13a is by flow around the reformer 6. As exemplified in FIG. 1, the upstream end of the heat exchange chamber 10a is approximately at the downstream second end 40b of the reformer 6.

When the flue gas 13a enters the heat exchange chamber 10a through flue gas conduit 12 at the end of the burner chamber 7a, it changes direction into an oppositely directed counter-flow in the heat exchange chamber 10a towards the first end 40a of the reformer 6 and along the inner cylindrical wall 6c, which is in an opposite direction as compared to the flow in the burner chamber 7a and opposite to the direction of the reformer gas in the reformer 6. When arriving at the first end 40a, the flue gas 13a flows around the first end 40a of the reformer 6 and within housing 39 changes direction once more into a flow along the outer cylinder wall 6d of the reformer 6 in parallel and in the same direction as the flow in the burner chamber 7a and the reformer 6.

After transfer of thermal energy from the flue gas 13a to the reformer 6, once reaching the second end 40b of the reformer 6, the flue gas 13a exits the heat exchange chamber 10a at the second end 40b through flue gas conduit 9 into flue gas chamber 13.

The advantage of this configuration is heat transfer for the catalytic reaction in the reformer 6 not only from the inner cylindrical wall 6c but also from the outer cylindrical wall 6d, thereby allowing the reaction inside the reformer 6 to be heated more evenly from both sides, even if the reformer has a relatively large diameter. If only the inner cylindrical wall 6c or only the outer cylindrical wall 6d is heated, the heat transfer is not optimum.

In prior art configurations, where only one side of the reformer is heated, the lack of sufficient heat has been attempted improved by extending the walls of the burner into the reformer by a helical wall structure. However, this prior art principle implies that the wall of the burner guides the heat into the reformer by heat conduction through the metal walls. This requires that the burner is only used at moderate heat, as the heat transfer otherwise is too aggressive. The consequence thereof in the prior art is that the burner cannot be used at high efficiency so that clean burning is prevented. In the invention, this disadvantage has been overcome.

All in all, in comparison between the illustrated embodiments and the prior art, the indirect heat transfer through flow of the flue gas 13a flowing along the reformer walls 6b yields a more moderate heating than heat transfers directly through the metal walls from the burner walls 7b to the reformer walls 6b, while at the same time providing a large and optimized total amount of heat because the heat is transferred to both the inner cylindrical wall 6c and the outer cylindrical wall 6d.

Optionally, radiation energy from the burner 7 through the burner walls 7b is added to increase efficiency.

Optionally, the cooled coolant in the cooling circuit 22 upstream of the fuel cell 16 receives further thermal energy from the flue gas 13b by heat exchange in the heat exchanger 14 downstream of the flue gas chamber 13.

From the cathode of the fuel cell 16, through connection 33, air and water steam is entering the flue gas chamber 13 and mix with the flue gas 13a before reaching the heat exchanger 14 for transfer of thermal energy to the coolant in the cooling circuit 22, through which the cooling-liquid is pumped by pump 15.

After cooling the fuel cell 16 by take up of further thermal energy from the fuel cell 16, the coolant enters a further heat exchanger 18, through which heat is used for heating other components, for example the battery in the vehicle or the cabin.

Typical temperatures in centigrade for a HTPEM fuel cell stack during steady state operation:
Fuel cell: 170 degrees Celsius
Cooling-liquid: 160 degrees Celsius
Catalyser in reformer: 280 degrees Celsius
Flue gas: 350-400 degrees Celsius Optionally, in start-up situations, the same burner 7 can be used as an initial heat-up burner. In this case, methanol is received from a corresponding methanol dosing valve 21 through a methanol inlet 2 and injected into the burner-chamber 7a through methanol injection nozzle 5. For the burning, typically catalytic burning by a burner catalyser, air 32 is entering through air inlet 31.

The flue gas transfers the highest amount of heat to the inner cylindrical wall 6c at the position where the flue gas 13a exits the burner chamber 7a and approaches the reformer wall 6b. Gradually the flue gas 13a gets its temperature reduced while flowing along the inner cylindrical wall 6c towards the first end 40a. However, this does not necessarily imply that the inner cylindrical wall 6c at the first end 40a receives the lowest total amount of heat. This is so because radiation energy from the burner wall 7b is added to the inner cylindrical wall 11c, especially, at the first end 40a, as the temperature in the burner chamber 7a is highest at the nozzle 5.

Figure 2A:
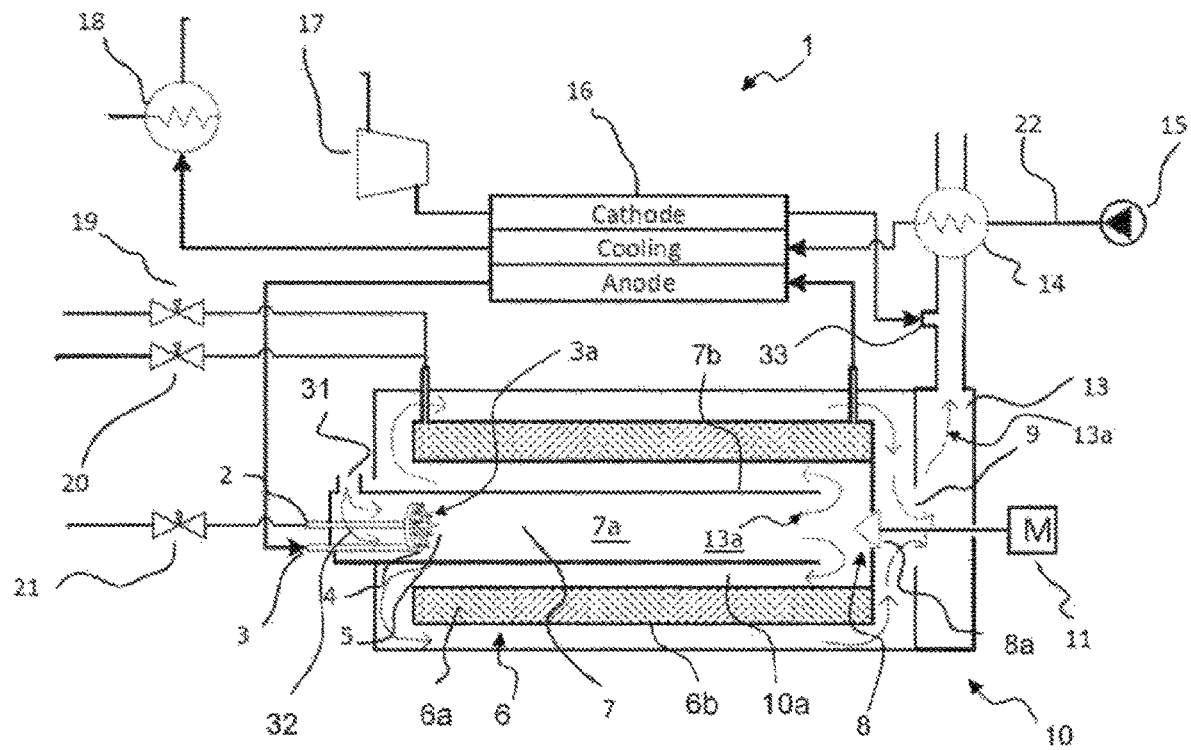
FIG. 2a illustrates an alternative embodiment with a valve, where the compact burner/reformer unit in steady state operation.
Figure 2B:
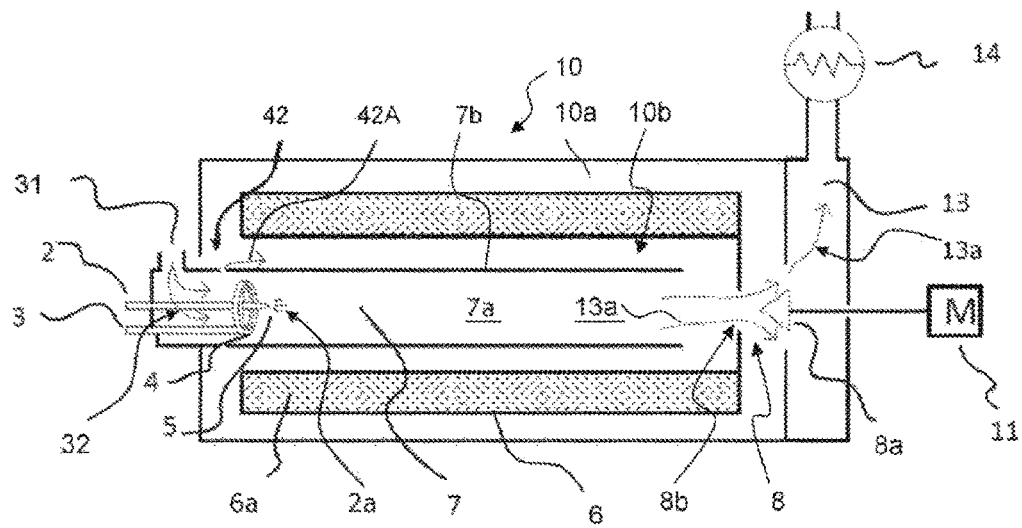
FIG. 2b illustrates the alternative embodiment in start-up condition.

A further development is illustrated in FIGS. 2a and 2b, the latter only showing a portion of the fuel cell system for ease of illustration. Special attention is drawn to the bypass valve 8 with a closure-member 8a that is regulated by an actuator 11 and which is used to direct the flue gas 13a into the flue gas chamber 13 such that the reformer 6 is by-passed in start-up situations.

The system in FIG. 2a illustrates a similar situation as the system in FIG. 1, as the valve 8 is closed and substitutes the separation wall 52. In this embodiment, FIG. 2a illustrates the configuration during steady state operation, and FIG. 2b illustrates a start-up situation.

As illustrated in FIG. 2b, the closure-member 8a of the by-pass valve 8 has been brought to a configuration where the closure-member 8a has been withdrawn from the valve seat 8b and the by-pass valve 8 is fully open, so that the burner-chamber 7a is connected to the flue gas chamber 13 for flow of the flue gas 13a from the burner-chamber 7a to the flue gas chamber 13 while by-passing the heat exchange chamber 10a that contains the reformer 6.

In the start-up situation, methanol 2a is received through a methanol inlet 2 and injected into the burner-chamber 7a through methanol injection nozzle 5. For the burning, typically catalytic burning by a burner catalyser, air 32 is entering through air inlet 31.

As illustrated and discussed, the burner walls 7b are not abutting the reformer walls 6b, but an insulating space 10b is provided there between, preventing direct heat conduction from the burner-chamber walls 7b to the reformer walls 6b. As an option, in order to further protect the reformer 6 from the heat of the burner 7, a by-pass airflow 42A can be established through air by-pass-orifice 42, creating an airflow 42A from the air inlet 31 and along outer side of the burner-chamber 7a in the insulating space 10b between the burner walls 7b and the inner reformer wall 6b. The airflow 42A not only further insulates the reformer 6 from the hot burner walls 7b of the burner-chamber 7 but also potentially removes heat from the reformer walls 6b. In the illustrated embodiment, the by-pass airflow 42A leaves the heat exchange chamber 10a through the valve 8 and combines with the flue gas 13a in the flue gas chamber 13. Optionally, the by-pass orifice can be closed for regulation of the by-pass air flow.

Optionally, it is possible to only partially open the by-pass valve 8, in which case the closure-member 8a is only slightly withdrawn from the valve seat 8b. In this case, a portion of the flue gas 13a is passing through the heat exchange chamber 10a and another portion through the by-pass valve 8. This is useful for adjusting the temperature of the reformer 6 and its catalyser 6a while preventing overheating of it. For example, in start-up situation, the by-pass valve 8 is fully open initially for aggressive and quick heating of the fuel cell 16, followed by a partially closure of the by-pass valve 8 in order to gradually and gently heat the reformer 6, until a sufficiently high temperature has been reached for the components to go into a normal steady state fuel cell operation, and the by-pass valve 8 is closed.

It is in principle possible to use the by-pass valve 8 for regulating and optimizing, for example continuously, the heat transfer to the reformer 6 also during steady state operation of the fuel cell system.

Figure 3:
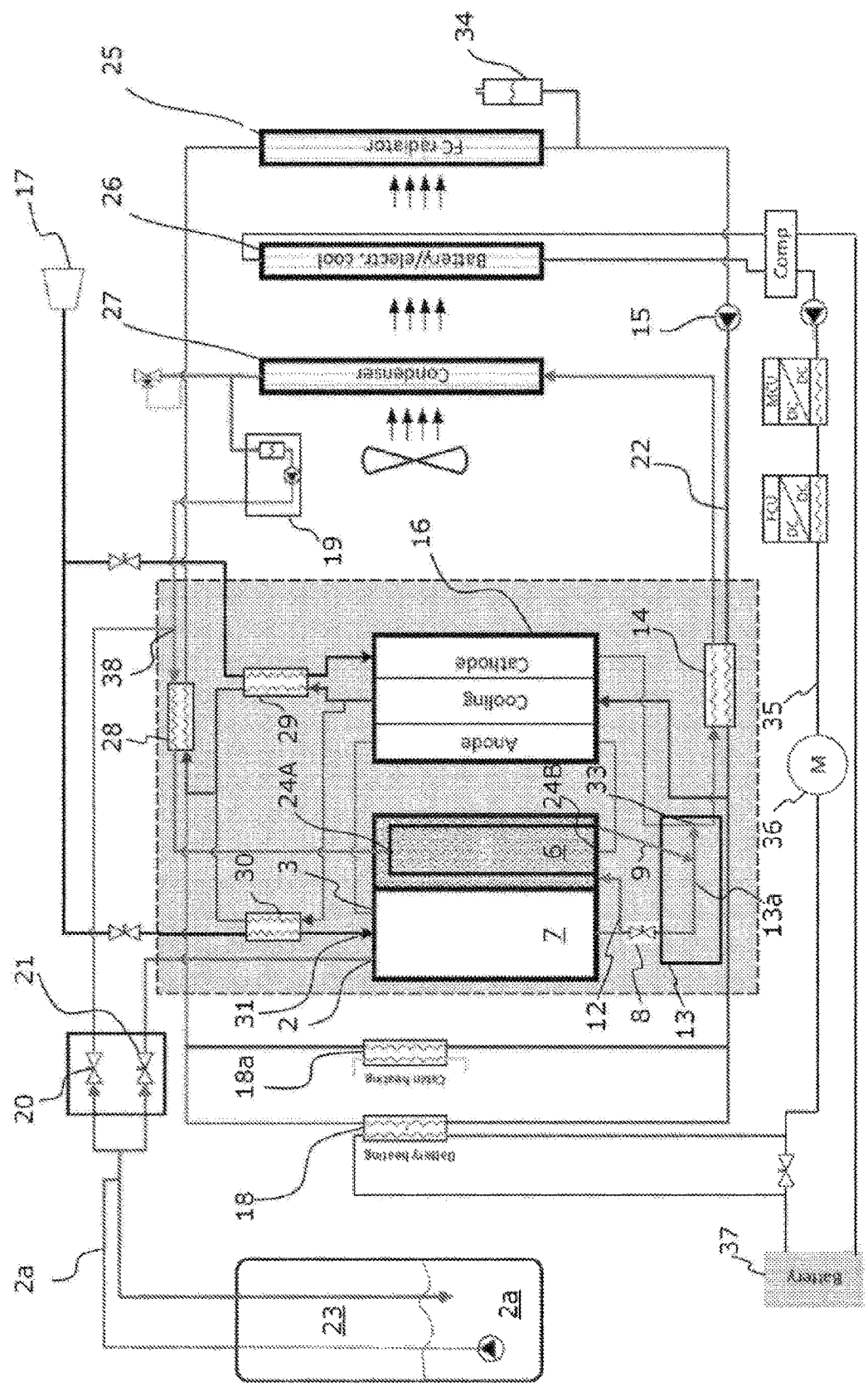
FIG. 3 illustrates a flow diagram for the fuel cell system.

FIG. 3 illustrates some of the flows through the fuel cell system. From the methanol tank 23, methanol 2a flows through methanol dosing valve 20 for being mixed with water from the water supply 19 at the mixing point 38. After evaporating in evaporator 28 downstream of the mixing point 38, the evaporated air/methanol mix is fed through inlet 24a into the reformer 6 for catalytic conversion into syngas which is then leaving the reformer 6 through outlet 24b and fed into the anode side of the fuel cell 16.

After catalytic reaction in the fuel cell for providing electricity, the partially converted syngas is exiting the anode side of the fuel cell as off-gas, which is entering the burner-chamber 7a through burner off-gas inlet 3 and used as fuel in the burner 7. Air is provided to the burner 7 through air inlet 31.

Reference is now made to FIG. 3. When the valve 8 is open, as illustrates in FIG. 2, the catalytically converted syngas/air mix in the burner-chamber 7a exits the burner as flue gas 13a through the valve 8 into the flue gas chamber 13 and, as illustrated in FIG. 3, mixes with water steam and remaining air from the cathode at mixing point 33. The hot mix leaves the flue gas chamber 13 and transfers heat in the heat exchanger 14 to the liquid in the cooling circuit 22. The steam is then condensed in condenser 27 and the water recycled for mixing with methanol 2a at mixing point 38 before entering the reformer 6.

When the valve 8 is open, only a very little part of the flue gas will find its way around the reformer 6 due to the resistance for the flow through the heat exchange changer 10b. However, if the valve 8 is closed, as illustrated in FIG. 2a, the flue gas from the burner 7a is pressed into the heat exchange chamber 10a and around the reformer 6 and leaves the reformer 6 through outlet conduit 9 into the flue gas chamber 13. In any intermediate position of the valve 8 between fully closed and open, there will be a corresponding portion of the flue gas flowing through the heat exchange chamber 10a and leave the reformer 6 and another portion leaving the burner 7a into flue gas chamber 13.

Notice that, in the illustrated example of FIG. 3, the steam from the cathode as well as the flue gas 13a, either directly from the burner or after heat transfer to the reformer 6, is recycled and mixed with methanol at mixing point 38 downstream of the condenser 27 for subsequent production of syngas. This implies that the water cycle for the fuel cell is a closed circuit.

In the primary cooling circuit 22, a fuel cell radiator (FC radiator) is used for adjusting the temperature of the coolant, which is pumped by coolant pump 15.

Optionally, a secondary cooling circuit 35 through cooler 26 is provided for adjusting the temperature of other equipment, for example for heating and/or cooling the batteries 37 in a vehicle or for heating a cabin of a vehicle. As illustrated, for heating or cooling purposes, a heat exchanger 18 is provided for thermal energy exchange between the primary cooling circuit 22 and the secondary cooling circuit 35. The heat from the coolant in the secondary cooling circuit 35, which is pumped by pump 36, is transferred through a corresponding heat exchanger 18 in order to keep the battery 37 at an advantageous fixed temperature, for example heated during start-up and cooled during steady state operation.

Optionally, a further cooling circuit is exchanging thermal energy with the primary cooling circuit 22 through a further heat exchanger 18a, for example for cabin heating in a vehicle.

A heat exchanger 30 upstream of the burner 7 is used for preheating air before entering the burner 7, which is of advantage in order to increase the up-start speed and also for increasing the efficacy of the burner 7. Air is also heated in a different heat exchanger 29 upstream of the cathode side of the fuel cell 16 for providing a temperature adjustment of the air from the compressor 17.

When having regard to FIGS. 1 and 2a, the amount of heat delivered at the second reformer end 40b from the direct burner gas relatively to the amount of heat delivered at the first end 40a by the combination of flue gas and radiation heat from the burner wall 7b at the first end 40a can be better adjusted with a configuration as explained in connection with FIG. 4a.

In this case, the flue gas conduit 12 for the flue gas 13a from the burner chamber 7a is provided as a plurality of openings 12' in the cylindrical burner wall 7b at a distance 45 to the second end 40b of the reformer 6 so that the flue gas 13a enters the heat exchange chamber 10a distal to the second end 40b of the reformer 6. Depending on the exact configuration, the distance 25 is adjusted. Also, the extension 26 of the flue gas conduit 12 along the central axis of the reformer 6 can be adjusted for optimization.

As an alternative to a number of openings, a single opening 12' could be used in the flue gas conduit, for example a slit opening that extends over a distance 26 as measured along the cylindrical axis. For example the single opening is a helical slit. The distance 25 is then measured similarly as for the opening, namely from the position of the opening closest to the second end as measured along the central axis of the reformer 6.

As a further alternative, several zones with openings 12' acting as flue gas conduit 12 can be arranged between the first end 40a and the second end 40b for optimization. An example with the flue gas conduit 12 being supplemented by a spaced further flue gas conduit 12A is illustrated in FIG. 4d.

Figure 4A:
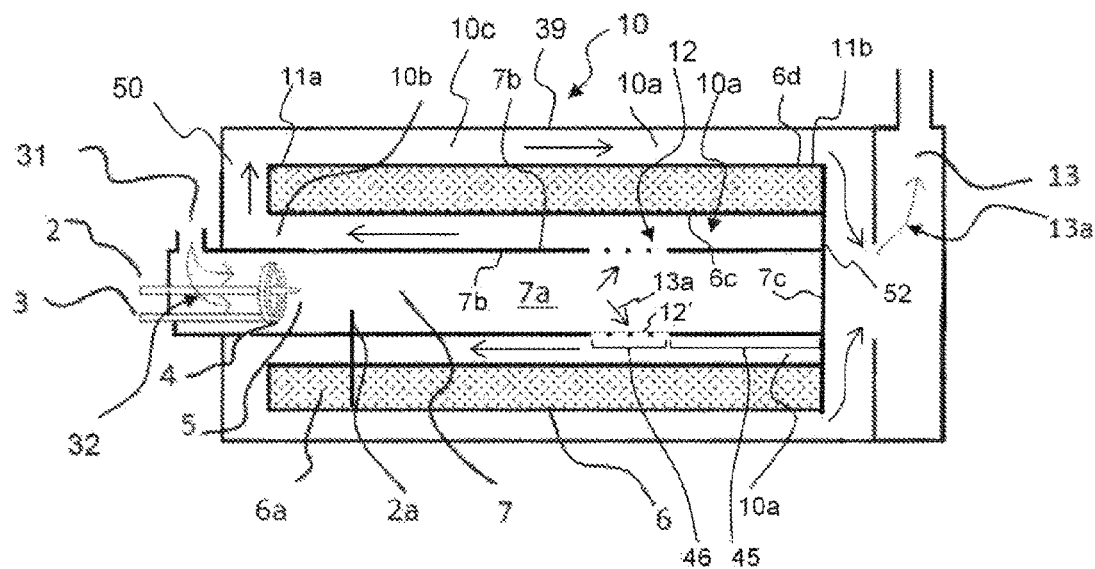
Figure 4B:
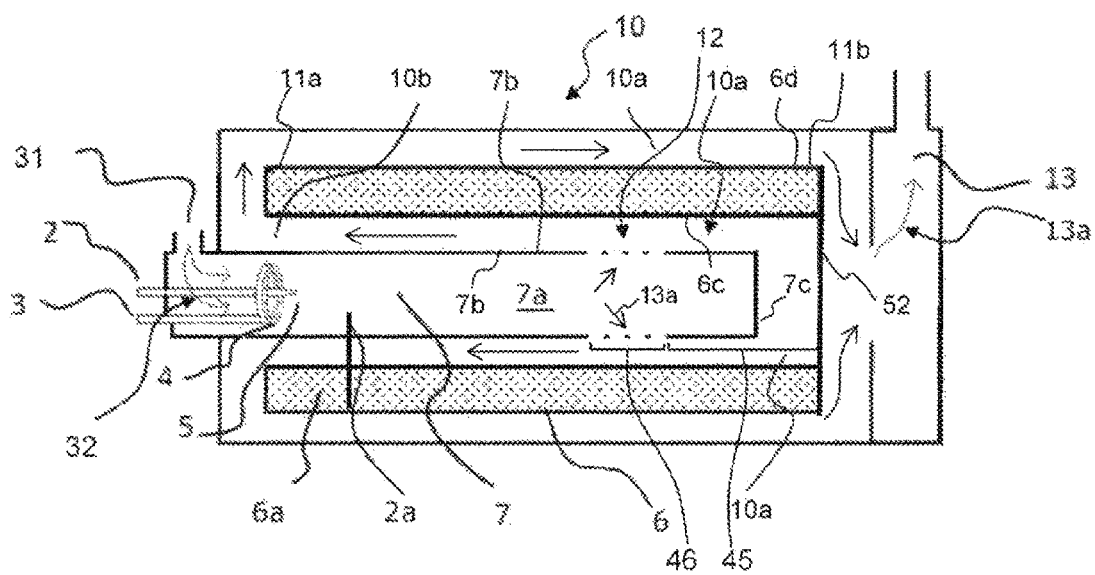

In the exemplified illustration of FIG. 4a, the burner end wall 7c is provided at the second end 40b of the reformer 6 and integral with the separation wall 52. However, this needs not be the case, as illustrated in FIG. 4b, where the end wall 7c of the burner 7 is distal to the separation wall 52 at the second end 40b of the reformer 6.

Figure 4C:
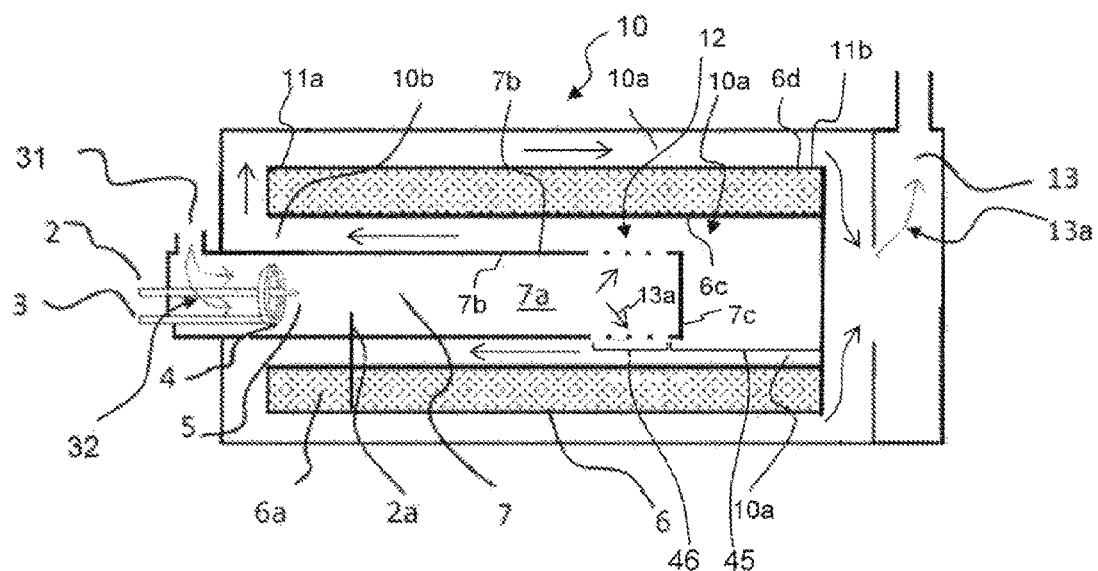
Figure 4D:
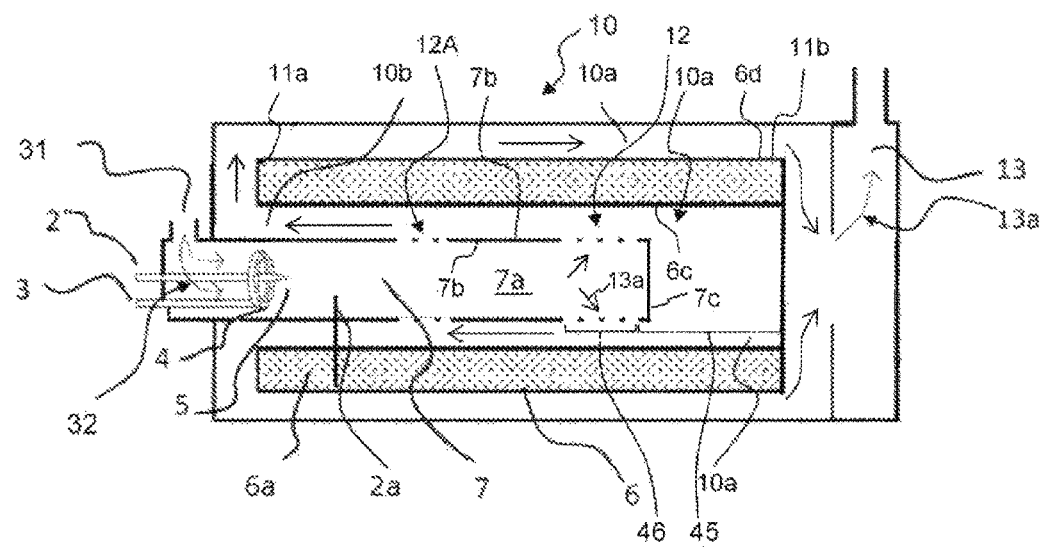

Optionally, the burner end wall 7c is provided at the end of the flue gas conduit 12, as illustrated in FIG. 4c. For example, the burner end wall 7c forms the end of the flue gas conduit 12.

Notice that the burner chamber 7a as well as the space 10b is sealed and separated from the flue gas conduit 9 so that flue gas 13a must flow around the reformer 6 at the front end 30 and through the further space 10c between the outer cylindrical wall and the housing 39 before flowing through flue gas conduit 9 into the flue gas chamber 13.

However, the configurations with the flue gas conduit 12 being offset from the second end 40b of the reformer 6 can be combined with the embodiment of FIG. 2 with the valve 8.

An example of a burner/reformer unit is shown in FIG. 5a in a shaded semitransparent illustration and in a line drawing in FIG. 5b. The injection manifold 4 is not shown but is optionally similar to the one of FIGS. 1 and 2 and is inserted into the burner chamber 7a as illustrated in FIG. 5. Also, inside the burner-chamber 7a, typically, a burner-catalyser is provided, for example in the form of granules, which however is not shown for simplicity.

Inside the reformer 6, a helical flow guide 44 forces the reformer gas into a helical movement in the reformer 6 between the inner cylindrical wall 6c and the outer cylindrical wall 6d. Notice that the averaged flow direction of the gas inside the reformer is unidirectional from the inlet 24a to the outlet 24b despite the helical motion of the gas.

As shown in more detail in FIG. 5b, flue gas 13a in the burner chamber 7 exits the burner chamber 7a through flue gas conduit 12, which in the exemplified illustration consists of a plurality of openings 12' distributed over a length 26 of the flue gas conduit 12, which is a fraction of the total length L of the reformer 6, for example in the range of 5% to 50%.

The flue gas conduit 12 is provided at a distance 25 from the second end 40b of the reformer 6, the distance 25 typically being in the order of 10-60% of L.

The total length 25+26 is typically less than 80% of L and typically larger than 15% of L.

When the flue gas 13a has left the burner chamber 7a through the flue gas conduit 12, the flue gas 13a moves in the heat exchange chamber 10a in the space 10b between the outer side of the burner wall 7b and the inner cylindrical wall 6c of the reformer 6. While flowing along the inner cylindrical wall 6c of the reformer 6, the flue gas 13a transfers heat to the inner cylindrical wall 6c and also takes up new heat from the cylindrical hot burner wall 7b. Furthermore, radiation energy is transferred from the burner wall 7b to the inner cylindrical wall 6c of the reformer 6. Accordingly, the heat transfer between the burner 7 and the reformer 6 is complex.

The flue gas 13a in the heat exchange chamber 10a in the space 10b between the outer side of the burner wall 7b and the inner cylindrical wall 6c of the reformer 6 flows towards the first end 40a of the reformer 6 and changes direction in the annular flue gas front-end chamber 50 and continues to flow in the heat exchange chamber 10a towards the second end 40b of the reformer 6 in the further space 10c between the housing 39 and the outer cylindrical wall 6d of the reformer 6. At the second end 40b of the reformer 6, the flue gas 13a flows though flue gas outlet conduit 9 to the flue gas chamber 13.

A probe 47 is used to monitor the temperature in the reformer 6 and another probe 48 is used to monitor the flue gas 13a temperature in the burner 7.

Possible exemplary dimensions are as follows:
reformer diameter: 50-200 mm
reformer length: 300-1000 mm
burner diameter: 20-40% of the reformer diameter
width of heat exchange chamber 10a: 1-4 mm
thickness of walls of burner and/or walls of reformer: 05-1.5 mm (typically metal)

The embodiment of FIG. 5 comprises an interplay of various factors, namely:
a space 10b between the burner wall 7b and the inner cylindrical wall 6c of the reformer 6;
a heat exchange chamber 10a in the space 10b between the burner wall 7b and the inner cylindrical wall 6c of the reformer 6 for flow of flue gas 13a along the inner cylindrical wall 6c;
extension of the heat exchanger chamber 10a around the first end 40a of the reformer 6 and to the outer cylindrical wall 6d of the reformer 6 into the further space 10c between the outer cylindrical wall 6d and the housing 39;
provision of the flue gas conduit 12 where the flue gas leaves the burner chamber 7a, the flue gas conduit 12 being provided between the first and second ends 40a, 40b of the reformer 6 and distal to the second end 40b when measure along the central axis 43 of the reformer 6;
a helical flow guide 44 inside the reformer 6.

The space 10b between the burner wall 7b and the inner cylindrical wall 6c of the reformer 6 prevents overheating of the reformer 6 by the burner 7. However, it still needs safeguarding that sufficient thermal energy is transferred from the burner 7 to the reformer 6. This is especially so in the case of the helical flow guide 44 that extends the flow path of the reformer gas inside the reformer 6. The helical flow guide 44 is an advantage as it increases the efficacy for the reforming while keeping the reformer 6 compact but, on the other hand, implies a demand for more thermal energy than a straight path from the first end 40a to the second end 40b of the reformer. In order to increase the transfer of thermal energy without overheating, the flue gas 13a is guided along both the inner cylindrical wall 6c as well as the outer cylindrical wall 6d, yielding transfer of thermal energy from both sides of the hollow cylindrical reformer. During the unidirectional path from the inlet 24a to the outlet 24b, the gas inside the reformer 6 is heated from both sides. Furthermore, the temperature profile can be optimised by positioning the flue gas conduit 12 between the first and second ends 40a, 40b of the reformer 6 and distal to the second end 40b. By this adjustment of the position of the flue gas conduit 12, and optionally by a one or more further flue gas conduits, more thermal energy can be provided at the upstream part of the reformer 6 near the first end 40a, where the demand for thermal energy is highest, whereas less thermal energy is provided at the second end 40b of the reformer 6, where the energy demand is less because most gas has already been reformed. However, the supply of energy at the first end has to be balanced with the radiation energy from the burner walls 7b, as this is also highest at the first end, where the burner manifold is provided and where the burning reaction starts. Accordingly, the various factors have a close interplay and result in common in a synergistic effect for the sake of optimization.

However, even when used individually in burner/reformer systems, for example burner/reformer systems in the prior art, these factors may also bring about improvements despite not being used in common with all the other above mentioned factors.

REFERENCE NUMBERS

1) Fuel cell system
2) Methanol inlet for burner 7
2a) Methanol flow from methanol inlet 2 to chamber 7a
3) Burner inlet for off gas from the anode of the fuel cell 16
3a) Anode off gas
4) Injection manifold for injecting off gas or fuel into burner 7
5) Methanol injection nozzle
6) Reformer
6a) Catalyst in reformer 6 for Methanol to Hydrogen reforming methanol to hydrogen
6b) reformer wall
6c) inner cylindrical wall of reformer
6d) outer cylindrical wall of reformer 6
7) Burner
7a) Burner-chamber
7b) Burner walls
7c) Burner end wall 8) By-pass valve
39a) Closure member of by-pass valve 8
9) Flue gas outlet conduit
10) Burner/reformer unit
10a) Heat exchange chamber between burner walls 7b and inner reformer wall 6c
10b) Space between burner walls 7b and inner reformer wall 6c
10c) Further space between housing 43 and outer reformer wall 6d
11) Actuator for by-pass valve 8

12) Flue gas conduit from burner camber 7a into heat exchange chamber 10a
12') openings in flue gas conduit 12
12A) Further gas conduit by-pass
13) Flue gas chamber
13a) Flue gas
14) Heat exchanger for heat exchange between flue gas 13a and cooling circuit 22
15) Circulation pump for liquid in cooling loop 2
16) Fuel cell
17) Air compressor
18) Auxiliary heat exchanger for example for heating of battery
139a) Auxiliary heat exchanger for example for heating of cabin or other equipment
19) Water dosing supply for reformer
20) Methanol dosing valve for reformer
21) Methanol dosing valve for start-up burner 20
22) Primary cooling circuit for fuel cell
23) Methanol tank
24a) Reformer inlet for methanol/water mix for syngas production
24b) Reformer outlet for syngas
25) Cooling loop radiator
26) Battery cooler
27) Condenser
28) Evaporator for evaporating methanol/water mix for reformer
29) Heat exchanger for preheating air for cathode
30) Heat exchanger for preheating air for burner 7
31) Air inlet for burner 7
32) air flow from air inlet 31 to burner-chamber 7a
33) Connection for mixing air and steam from cathode to flue gas 13a
34) expansion container
35) Secondary cooling circuit for battery 37 and other purposes
36) Pump for battery cooling circuit 35
37) Battery
38) Mixing point for methanol and water
39) Housing
40a) First end of reformer 6
40b) second end of reformer 6
41) Flue gas conduit from end of burner camber 7a into heat exchange chamber 10a
42) by-pass orifice (optional)
42A) by-pass air
42) Evaporator for methanol and water mix
43) Central axis of reformer 6
44) Helical flow guide
45) Distance from flue gas conduit 41 to second end 40b of reformer 6
46) Extension of flue gas conduit 41
47) Sensor probe in reformer 6
48) Sensor probe in burner 7
49) Length L of reformer 6
50) Flue gas front end chamber
52) Separation wall separating space 10c of heat exchange chamber 10a from the flue gas outlet conduit 9

The invention claimed is:

1. A fuel cell system, comprising:
a fuel cell;
a cooling circuit for recirculating coolant through the fuel cell for adjusting the temperature of the fuel cell with the coolant;
a reformer comprising a catalyser enclosed by reformer walls and configured for catalytic conversion of fuel vapor to syngas, wherein the reformer is conduit-connected to the anode side of the fuel cell for provision of syngas to the fuel cell;
an evaporator configured for evaporating liquid fuel and conduit-connected to the reformer for provision of the evaporated fuel to the reformer;
a liquid fuel supply conduit-connected to the evaporator for providing liquid fuel to the evaporator;
a burner comprising a burner-chamber inside burner walls, wherein the burner-chamber is configured for providing flue gas by burning anode waste gas or fuel or both, wherein the burner-chamber is in fluid-flow communication with the reformer walls for flow of the flue gas from the burner-chamber to and along the reformer walls for transfer of heat from the flue gas to the reformer walls for heating the catalyser by heat transfer through the reformer walls;
wherein the fuel cell system comprises a by-pass valve in communication with the burner-chamber and configured for regulating flow of the flue gas between
a) flow along the reformer walls,
and
b) flow out of the burner-chamber through a flue gas outlet conduit, by-passing the reformer walls for preventing it from flowing along the reformer walls.

2. The fuel cell system according to claim 1, wherein the flue gas outlet conduit on its downstream side is in flow-communication with a heat exchanger for transfer of thermal energy from the flue gas to the coolant in the cooling circuit for transfer of thermal energy to the coolant; wherein the by-pass valve is configured for changing between a start-up configuration state during start-up of the fuel cell system and a normal operation state after the start-up, where the by-pass valve in the start-up configuration is configured for causing a by-pass-quantity of more than half of the flue gas from the burner to by-pass the reformer and to reach the heat exchanger for transfer of a majority of thermal energy of the flue gas to the coolant and not to the reformer in order to heat the fuel cell to a normal operation temperature, and wherein the by-pass valve in the normal operation state is configured for closing the by-passing of the reformer and causing by the flue gas to flow along the reformer walls for heating of the reformer catalyser after the start-up.

3. The fuel cell system according to claim 2, wherein the by-pass valve is configured for gradual adjustment of the by-pass-quantity of flue gas that is by-passing the reformer, wherein the by-pass-quantity is in the range from a minimum amount to a maximum amount, wherein the minimum amount is less than 20% and the maximum amount is larger than 80% relatively to the total amount of flue gas produced by the burner.

4. The fuel cell system according claim 1, wherein the reformer walls are tubular and surround the burner walls, and wherein an insulation space is provided between the reformer walls and the burner walls for thermal insulation.

5. The fuel cell system according to claim 4, wherein an air supply into the insulation space is provided for flow of air through the insulation space for removal of heat from the insulation space during start-up conditions.

6. The fuel cell system according to claim 1, wherein the fuel cell is a high temperature proton electrolyte membrane, HTPEM, fuel cell configured for operating at a temperature in the range of 120-200 degrees Celsius, and wherein the liquid fuel is a mix of methanol and water.

7. The fuel cell system according to claim 1, wherein the liquid fuel supply comprises a methanol reservoir for supplying methanol as well as a water supply for supplying water and for mixing the water with the methanol at a mixing point upstream of the evaporator, wherein the water supply is configured for supply of water that is recycled from the flue gas of the burner.

8. The fuel cell system according to claim 7, wherein the water supply is part of a recycling circuit from the mixing point, through the evaporator, through the reformer, through the anode side of the fuel cell, through the burner, through a condenser, and back to the mixing point.

9. The fuel cell system according to claim 8, wherein the recycling circuit is configured for adding water from the outlet of the cathode side of the fuel cell.

10. The fuel cell system according to claim 1, comprising a further heat exchanger for transfer of thermal energy from the coolant to air upstream of the burner in order to increase the temperature of the air prior to entering the burner-chamber.

11. The fuel cell system according to claim 1, wherein the cooling circuit is a primary cooling circuit, and wherein the fuel cell system comprises a secondary cooling circuit with coolant separated from the coolant in the primary cooling circuit; wherein the fuel cell system comprises a secondary heat exchanger for transfer of thermal energy between the primary cooling circuit and the secondary cooling circuit, wherein the secondary cooling circuit is in thermal connection with a battery and configured for regulating the temperature of the battery.

12. A method of operating a fuel cell system, the fuel cell system, comprising:
  a fuel cell;
  a cooling circuit for recirculating coolant through the fuel cell for adjusting the temperature of the fuel cell with the coolant;
  a reformer comprising a catalyser enclosed by reformer walls and configured for catalytic conversion of fuel vapor to syngas, wherein the reformer is conduit-connected to the anode side of the fuel cell for provision of syngas to the fuel cell;
  an evaporator configured for evaporating liquid fuel and conduit-connected to the reformer for provision of the evaporated fuel to the reformer;
  a liquid fuel supply conduit-connected to the evaporator for providing liquid fuel to the evaporator;
  a burner comprising a burner-chamber inside burner walls, wherein the burner-chamber is configured for providing flue gas by burning anode waste gas or fuel or both, wherein the burner-chamber is in fluid-flow communication with the reformer walls for flow of the flue gas from the burner-chamber to and along the reformer walls for transfer of heat from the flue gas to the reformer walls for heating the catalyser by heat transfer through the reformer walls;
  wherein the fuel cell system comprises a by-pass valve in communication with the burner-chamber and configured for regulating flow of the flue gas between
    a) flow along the reformer walls,
    and
    b) flow out of the burner-chamber through a flue gas outlet conduit, by-passing the reformer walls for preventing it from flowing along the reformer walls;
    and wherein the method comprises operating the by-pass valve and as a consequence of operating the by-pass valve regulating the flow of the flue gas between flow along the reformer walls and flow that is by-passing the reformer walls.

13. The method according to claim 12, wherein the method comprises, during start-up of the fuel cell, setting the by-pass valve into a start-up configuration and by the by-pass valve causing a by-pass-quantity of more than half of the flue gas from the burner to by-pass the reformer.

14. The method according to claim 13, wherein the flue gas outlet conduit on its downstream side is in flow-communication with a heat exchanger for transfer of thermal energy from the flue gas to the coolant in the cooling circuit for transfer of thermal energy to the coolant; wherein the method comprises causing a by-pass-quantity of more than half of the flue gas from the burner to by-pass the reformer and to reach the heat exchanger for transfer of a majority of thermal energy of the flue gas to the coolant and not to the reformer in order to heat the fuel cell to a normal operation temperature.

15. The method according to claim 13, wherein the method comprises, after the start-up, setting the by-pass valve into a normal operation configuration and closing the by-pass of the reformer by the flue gas and causing all of the flue gas to flow along the reformer walls for heating of the reformer catalyser during normal operation.

16. The method according to claim 13, wherein the reformer walls are tubular and surround the burner walls, and wherein an insulation space is provided between the reformer walls and the burner walls for thermal insulation, wherein an air supply into the insulation space is provided for flow of air through the insulation space for removal of heat from the insulation space during start-up conditions, wherein the method comprises, during start-up, providing an air flow through the air supply and into and along the insulation space for removal of heat from the insulation space.

17. The method according to claim 13, wherein the fuel cell is a high temperature proton electrolyte membrane, HTPEM, fuel cell and the method comprises operating the fuel cell at a temperature in the range of 120-200 degrees Celsius and providing the liquid fuel as a mix of methanol and water.

18. The method according to claim 13, wherein the liquid fuel supply comprises a methanol reservoir for supplying methanol as well as a water supply for supplying water and for mixing the water with the methanol at a mixing point upstream of the evaporator, wherein the water supply is part of a recycling circuit from the mixing point, through the evaporator, through the reformer, through the anode side of the fuel cell, through the burner, through a condenser, and back to the mixing point, wherein the method comprises supplying water and methanol to the mixing point, evaporating the mix of water and methanol in an evaporator, feeding the evaporated mix as fuel into the reformer and catalytically reacting the fuel to syngas, feeding the syngas into the anode side of the fuel cell and producing off-gas, feeding the off-gas into the burner and burning the off-gas to flue-gas, feeding the flue gas into a condenser and condensing water out of the flue gas, feeding the condensed water back to the mixing point for repeating the cycle.

19. The method according to claim 18, wherein the method comprises adding water from the outlet of the cathode side of the fuel cell to the recycling circuit.

20. The method according to claim 13, wherein the fuel cell system comprises a further heat exchanger for transfer of thermal energy from the coolant to air upstream of the burner and the method comprises by the coolant increasing the temperature of the air prior to entering the burner-chamber for increasing the energy efficacy of the fuel cell system.

* * * * *